United States Patent
Garg et al.

(10) Patent No.: US 12,259,948 B1
(45) Date of Patent: Mar. 25, 2025

(54) THREE DIMENSIONAL OBJECT PART RETRIEVAL

(71) Applicant: Amazon Technologies, Inc., Seattle, WA (US)

(72) Inventors: Nikhil Garg, Berlin (DE); Bojan Pepik, Berlin (DE); Matthieu Guillaumin, Berlin (DE)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 225 days.

(21) Appl. No.: 16/834,736

(22) Filed: Mar. 30, 2020

(51) Int. Cl.
| | | |
|---|---|---|
| *G06F 18/2413* | (2023.01) | |
| *G06N 3/08* | (2023.01) | |
| *G06N 20/00* | (2019.01) | |
| *G06T 7/10* | (2017.01) | |
| *G06T 17/00* | (2006.01) | |

(52) U.S. Cl.
CPC ......... *G06F 18/24147* (2023.01); *G06N 3/08* (2013.01); *G06N 20/00* (2019.01); *G06T 7/10* (2017.01); *G06T 17/00* (2013.01); *G06T 2207/20084* (2013.01); *G06T 2210/12* (2013.01)

(58) Field of Classification Search
CPC ......... G06K 9/6276; G06T 7/10; G06T 17/00; G06T 2207/20084; G06T 2210/12; G06N 20/00; G06N 3/08
See application file for complete search history.

(56) References Cited

U.S. PATENT DOCUMENTS

| | | | |
|---|---|---|---|
| 9,916,345 B1 * | 3/2018 | Makadia | G06F 16/58 |
| 10,297,070 B1 * | 5/2019 | Zhu | G06V 30/19173 |
| 11,089,281 B2 * | 8/2021 | Begeja | G06V 20/48 |
| 11,403,697 B1 * | 8/2022 | Wu | G06F 3/04812 |
| 2009/0009513 A1 * | 1/2009 | van den Hengel | G06T 7/579 345/420 |
| 2017/0337733 A1 * | 11/2017 | Georgescu | G06T 7/97 |
| 2020/0273090 A1 * | 8/2020 | Ayush | G06T 7/75 |
| 2020/0334826 A1 * | 10/2020 | Soler | G06T 7/11 |
| 2021/0097258 A1 * | 4/2021 | Mohan | G06K 9/6232 |

\* cited by examiner

*Primary Examiner* — Kenny A Cese
(74) *Attorney, Agent, or Firm* — K&L Gates LLP

(57) ABSTRACT

Devices and techniques are generally described for retrieving three dimensional part models. Two-dimensional (2D) image data representing an object with at least a first part and a second part may be received. A first machine learning model may be used to generate a first shape embedding representing the first part and a second shape embedding representing the second part. A first 3D model stored in a non-transitory computer-readable memory that represents the first part may be determined based at least in part on the first shape embedding. A second 3D model stored in the non-transitory computer-readable memory that represents the second part may be determined based at least in part on the second shape embedding.

17 Claims, 6 Drawing Sheets

THREE DIMENSIONAL OBJECT PART RETRIEVAL

BACKGROUND

Accurately estimating three-dimensional ("3D") shapes from two-dimensional ("2D") images is a classical task in computer vision. 3D shapes generated from 2D objects may be used to position the object in a 3D environment and/or to see the object from different angles. For example, 3D image data may be used in an augmented reality and/or virtual reality environment to place a realistic looking object in a 3D environment so that the object can be perceived from different angles and interacted with in three dimensional space.

DETAILED DESCRIPTION

Figure 1:
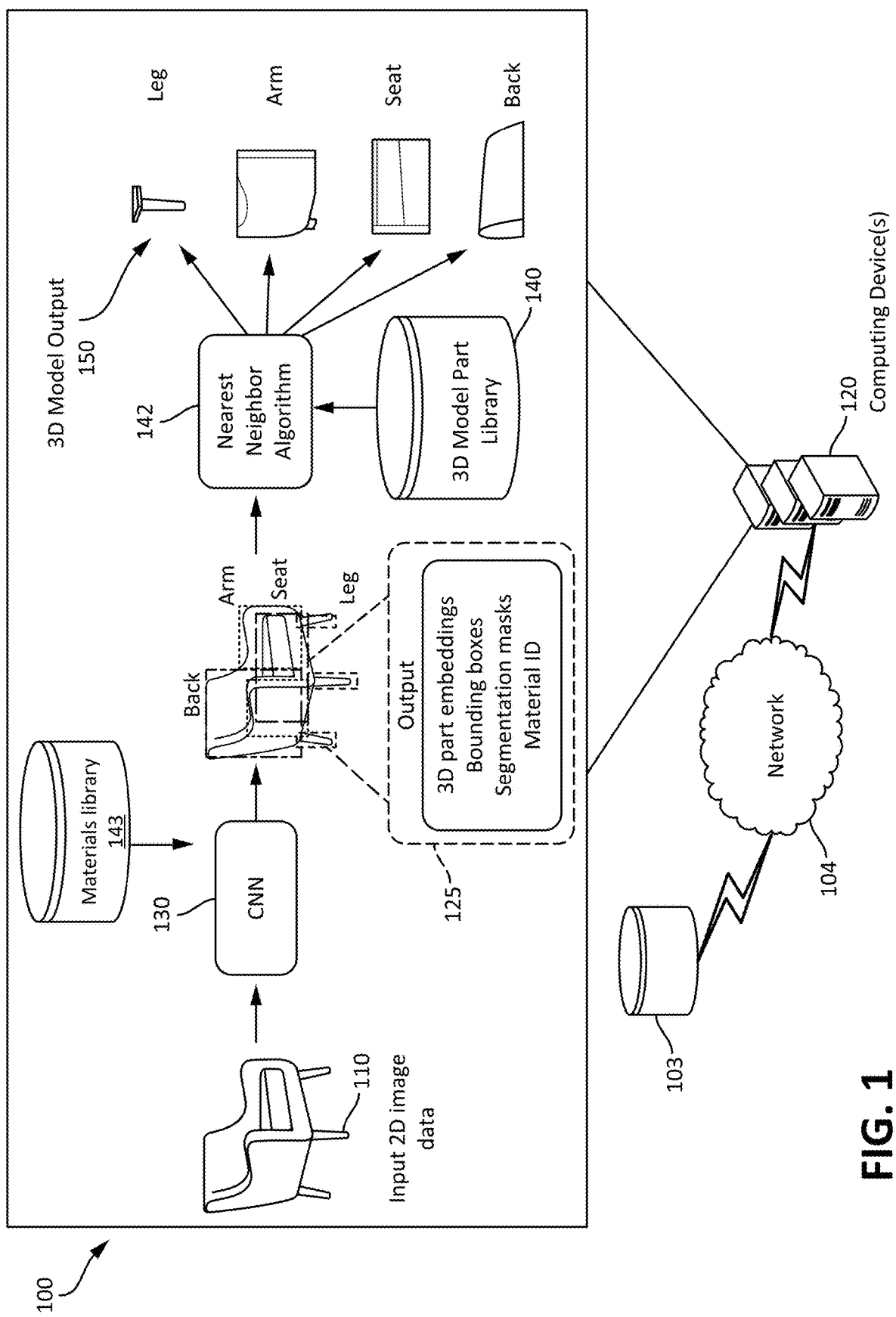
FIG. 1 is a diagram of an example system configured to retrieve three-dimensional part models, according to various embodiments of the present disclosure.

In the following description, reference is made to the accompanying drawings that illustrate several example embodiments of the present disclosure. It is understood that other examples may be utilized and various operational changes may be made without departing from the scope of the disclosure. The following detailed description is not to be taken in a limiting sense, and the scope of the embodiments of the present invention is defined only by the claims of the issued patent.

Three-dimensional (3D) models may be generated as a 3D representation of an object for various different applications. For example, a 3D model may be used to see an object from multiple different perspective views. In another example, a 3D model of an object may be used to understand how the object appears under different lighting conditions. 3D models are often used in augmented reality and/or virtual reality so that representations of the object may be perceived within the augmented and/or virtual environment.

Generating 3D models of objects represented in two-dimensional (2D) image data is a classical problem in computer vision. Often, artists use various software tools (e.g., Zbrush, Maya, etc.) order to generate realistic looking 3D models from objects depicted in a 2D image. While this approach generates realistic looking 3D models, it is very time consuming with a typical 3D model often several hours to generate. Additionally, the artist-based approach requires significant expertise in order to generate a 3D model for a reasonably complex product or other object. Accordingly, partial or full automation of the 3D modeling process may result in large cost savings and decreased modeling time.

The 3D modeling process can be broadly divided into two parts: (1) creating the 3D model representing the shape of the product, and (2) creating physically-based rendering (PBR) materials that significantly contribute to the photorealism of the result. Described herein are techniques that may be used to at least partially automate both 3D model retrieval and determination of PBR materials for 3D object part modeling.

In the traditional artist-based approach described above, a 3D artist typically constructs an object in a modular fashion. For instance, different parts an object may be separately modeled and thereafter combined to generate the 3D model of the complex object. For example, a 3D artist modeling a chair may model separate parts of the chair (e.g., legs, arms, seat, back, etc.) using separate meshes for each part. After generating a separate 3D model (e.g., a separate 3D mesh) for each part, the parts may be combined by the artist to form the whole object.

In various examples, the techniques described herein may automatically identify parts of an object depicted in an input 2D image and may determine 3D models that are the closest match to the identified parts. In various examples, an artist may modify and/or combine the retrieved 3D models of the different parts of an object to generate a 3D model of the object represented in the 2D input image. In some further examples, machine learning models may be trained to automatically modify the retrieved 3D models to more closely resemble the corresponding part depicted in the input 2D image data. Additionally, in some further examples, machine learning models may be trained to combine the retrieved and/or modified 3D models to generate the 3D model of the whole object.

Retrieval of previously-generated 3D models of object parts (e.g., object components) may greatly reduce the amount of artist time necessary to model objects in 3D, as artists may simply modify pre-existing similar meshes rather than generate new meshes "from scratch." Accordingly, in one example embodiment, the various techniques described herein may automatically identify the different component parts of an object and may provide 3D model "templates" that are the closest matches in the 3D model part library to the object parts in the input 2D image data.

Additionally, as described herein, in an embodiment, one or more materials are identified for each detected part in the 2D image data. The materials may be selected from a library of PBR materials. The selected PBR material may be the material that is determined to most closely resemble the characteristics of the part as represented in the 2D input image. Machine learning approaches are used to identify a material to be used to represent a part detected in 2D input image data. The identified materials may be output in association with the 3D model part retrieved from the library.

In various embodiments described herein, machine learning approaches are used to generate embeddings representing 3D representations of parts appearing in 2D input image data. Generally, in machine learning, an embedding is a mapping of a discrete, categorical variable to a vector of continuous numbers. In neural networks, embeddings are typically of lower dimensions relative to the data that the embeddings represent.

Machine learning techniques are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a diagram of an example system 100 configured to retrieve three-dimensional part models, according to various embodiments of the present disclosure. As depicted in FIG. 1, computing device(s) 120 may include a non-transitory computer-readable memory 103 and/or may be configured in communication with non-transitory computer-readable memory 103, such as over network 104. In various examples, network 104 may represent a local area network (LAN) and/or a wide area network (WAN) such as the internet.

Input 2D image data 110 may be one or more frames of image data representing an object. For example, the input 2D image data 110 may be a photograph of a chair sitting in a living room. The input 2D image data 110 may be input into a trained segmentation model (e.g., a CNN 130 or other machine learning model). The CNN 130 (e.g., a CNN 130 or other machine learning model) may generate bounding boxes surrounding a set of pixels corresponding to different identified parts of the object and/or segmentation masks corresponding to the different identified parts of the object. For example, output 125 generated by a CNN 130 or other machine learning model may comprise a bounding box and/or segmentation mask identifying the pixels of input 2D image data 110 corresponding to different parts of the chair. For example, bounding boxes may surround the chair legs, the chair arms, the chair back, the chair seat, etc. Additionally, as described in further detail below, the CNN 130 or other machine learning model may predict an appropriate material for each identified part and may generate a part embedding for each identified part. The part embedding may be compared with 3D models of parts generated by artists (and/or by using any other suitable means) and stored in 3D model part library 140. Although a CNN network is generally discussed herein, other machine learning models/algorithms may be used instead to generate the part embeddings for each identified part. For example, a Mask RCNN, fully convolutional networks (FCN), DeepLab v3, UNET, etc., may be used to generate part embeddings for identified parts, as described herein. Accordingly, while a CNN may be referred to herein, it should be appreciated that any machine learning model effective to generate part embeddings from input 2D image data may be used in place of a CNN.

Nearest neighbor algorithm 142 may determine a 3D model of a part that is stored in the 3D model part library 140 that has an embedding that is closest (in the shape embedding space) to the part embedding output by the CNN 130. For example, a Euclidean distance or cosine similarity or distance may be determined between the part embedding generated by the CNN 130 and each embedding of the 3D models stored in 3D model part library 140. The 3D model part associated with the smallest distance (e.g., minimum distance among all 3D models stored in the 3D model part library 140) may represent the 3D part model of the 3D model part library 140 that most closely corresponds to the part represented by the input 2D image data 110. In various examples, the top k closest 3D models stored in 3D model part library 140 may be output, allowing an artist and/or other user to select from among the top k closest 3D models to represent the part in the input 2D image data 110. In the foregoing example, k may be a tunable parameter that may be selected and/or adjusted, as desired.

Accordingly, for each part of an object identified by CNN 130, the closest matching 3D model part from 3D model part library 140 may be output as 3D model output 150. Accordingly, in the example depicted in FIG. 1, a 3D model of a piece of furniture (e.g., a chair leg) is output, as the 3D model of the furniture leg may be associated with a 3D embedding that is closest in the 3D embedding space to a leg of the chair represented in input 2D image data 110. As shown in FIG. 1, 3D model output 150 also includes a 3D model of a chair arm, seat, and back. Thereafter, the 3D models included in the 3D model output 150 may be modified to more closely resemble the corresponding parts in the input 2D image data 110. Additionally, after modification, the 3D model parts may be combined either by an artist or by an additional machine learning model trained to combine parts of objects into whole objects. In various examples, the embedding space may also be referred to as a shape embedding space.

Additionally, as described in further detail below, the CNN 130 may comprise an additional branch (sometimes referred to as a "head" or a CNN branch) effective to predict a material for each identified part. The material may be selected from a materials library 143. Materials may include texture maps that may include base color data, roughness data, metallic data, normal data, height texture maps, etc. In various examples, the material may include a software-specific editable file (e.g., such as a Blender Node Graph or Substance Painter/Designer project files) to allow post-retrieval edits to the material. In some other examples, the materials may be non-editable.

A softmax layer may be used as a part of the material-selection branch of the CNN 130. The softmax layer may include a node for each material in the material library. Accordingly, the material selected for a particular part may be the material in materials library 143 that is associated with the node with the highest probability score and/or probability vector. Additionally, in various examples, instead of outputting the material with the highest probability score, the top k highest probability scored materials stored in materials library 143 may be output, allowing an artist and/or other user to select from among the top k materials to represent the material of the part in the input 2D image data 110. In the foregoing example, k may be a tunable parameter that may be selected and/or adjusted, as desired.

Figure 2:
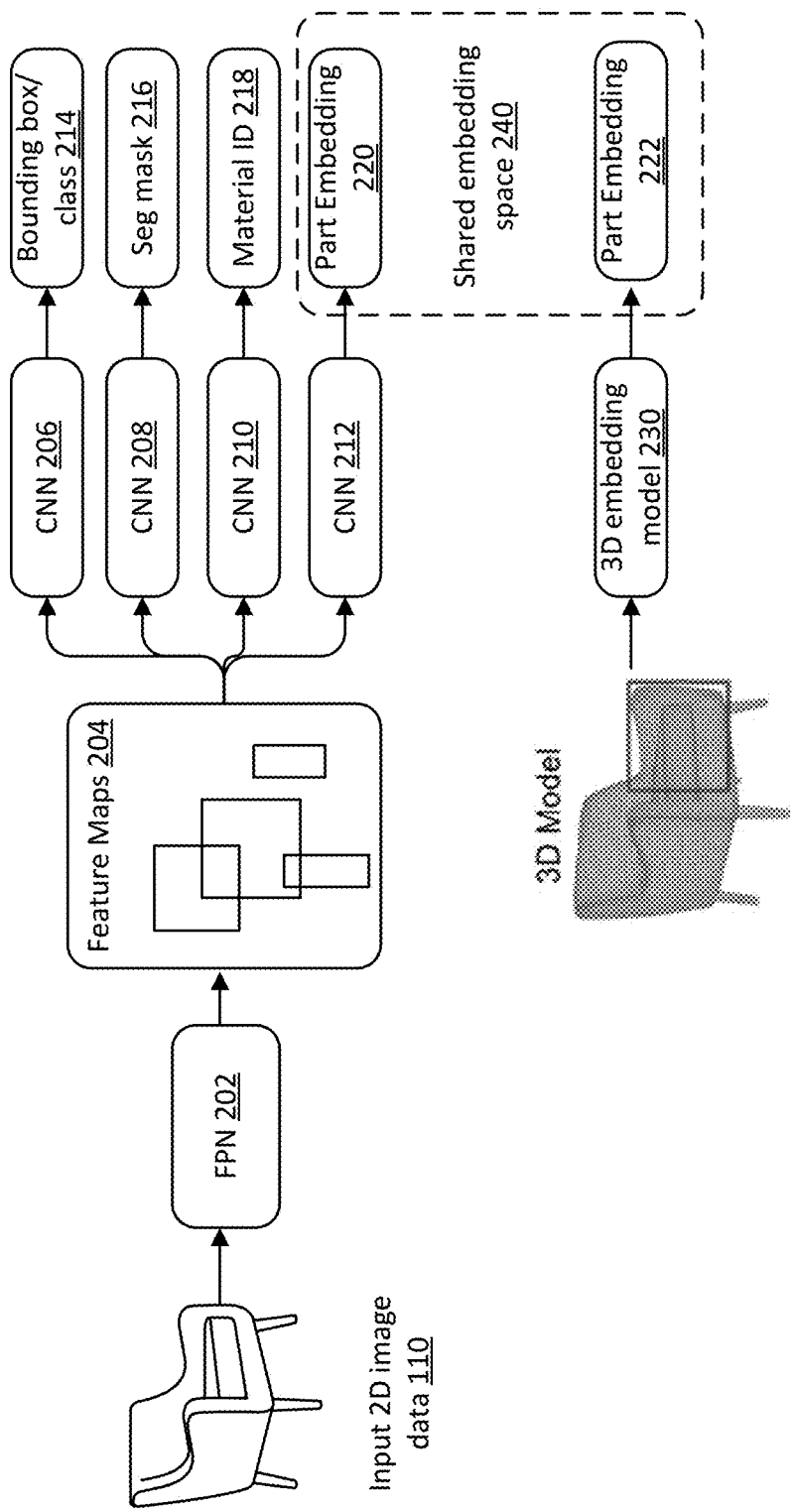
FIG. 2 depicts an example of a multi-headed convolutional neural network architecture for three-dimensional part model retrieval, in accordance with various aspects of the present disclosure.

FIG. 2 depicts an example of a multi-headed convolutional neural network (CNN) architecture for three-dimensional part model retrieval, in accordance with various aspects of the present disclosure. In the example depicted, a CNN (such as CNN 130 depicted in FIG. 1) includes a feature extraction network, such as a feature pyramid network (FPN) 202. The FPN 202 (or other feature extractor) may generate feature maps 204. The feature maps 204 represent features present in the input image. For example, during training, the FPN 202 or other feature extractor network may learn to extract features distinguishing object parts from other object parts. The CNN model used to generate the part embeddings from the 2D image data (such as CNN 130 depicted in FIG. 1) may also include one or more CNN branches or "heads" such as CNN 206, CNN 208, CNN 210, CNN 212, etc., that may include particular functionalities, as described in further detail below.

The feature maps 204 may be the output of some hidden layer of FPN 202 and/or some other hidden layer of CNN 130 (FIG. 1). The feature maps 204 may be sent to each branch/head of the multi-headed CNN represented in FIG. 2. In the example, the feature maps 204 may be sent to convolutional neural network (CNN) 206. CNN 206 may be trained to generate output 214. Output 214 may include a respective bounding box surrounding each distinct part represented in the input 2D image data 110. Additionally, in some examples, CNN 206 may generate output 214 comprising class labels identifying different parts present in the input 2D image data 110. For example, CNN 206 may generate a class label for each bounding box. CNN 206 may be trained (either separately from FPN 202 or in an end-to-end fashion) using training data comprising 2D image data labeled with ground truth bounding boxes and corresponding class labels.

In some further examples, feature maps 204 may be sent to CNN 208. CNN 208 may be trained to segment pixels representing a part of an object from other pixels in the input 2D image data 110. For example, CNN 208 may generate an output 216 comprising a segmentation mask denoting all pixels thought to correspond to a particular object part as "foreground" and all other pixels as "background." Accordingly, the segmentation mask may distinguish pixels representing an identified object part from pixels in the input 2D image data that do not represent that part. CNN 208 may be trained (either separately from FPN 202 or in an end-to-end fashion) using training data comprising ground truth segmentation masks. In some examples, instead of a segmentation branch, CNN 208 may implement part detection using Faster R-CNN, single shot detection (SSD), you only look once (YOLO) detection, etc. Various segmentation and/or part detection methodologies may be used apart from those specifically mentioned above. For example, semantic part segmentation, functional, and/or constructive part segmentation may be used to segment various parts from the input 2D image data 110. Additionally, in another example, randomly sampled parts may be determined from the image.

In various examples, output generated by CNNs 206, 208 may not be used during 3D object part removal. Instead, the training of CNNs 206, 208 may improve the feature maps 204 generated by the FPN 202. The improved feature maps 204 may be input into CNNs 210 and 212. The output of CNNs 210 and 212 may be used for 3D object part retrieval, as described in further detail below.

In some further examples, feature maps 204 may be sent to CNN 210. CNN 210 may be trained to determine an output 218 comprising a material ID for each part recognized in input 2D image data 110 (e.g., for each bounding box generated by CNN 206). In various examples, CNN 210 may be trained using training data comprising pixels and/or bounding boxes labeled with ground truth material IDs (material identifiers) that identify a material of which a part is made. Additionally, the training data for CNN 210 may come from a variety of sources. For example, objects with pre-annotated material IDs, synthetic training data with annotated material IDs, etc. In an example, to synthesize training data, each material in the materials library 143 may be applied to parts of different 3D models. Material recognition by CNN 210 may be applied on the entire image, on segmented parts, and/or on user-defined image regions. CNN 210 may have a softmax output layer that may generate a per-material probability that a particular part in input 2D image data 110 is made of a particular material. The sum of the probabilities in the softmax layer may equal 1. Accordingly, the node in the softmax layer that is associated with the highest probability score may be selected. Additionally, as previously described, the top k highest probability scored materials may be output so that a user may select from among the materials, as desired. Each node in the softmax layer may correspond to a different material stored in a material library (e.g., a non-transitory computer-readable memory). Similar to the other heads of the CNN 130, CNN 210 may be trained separately and/or in an end-to-end fashion with the other heads and/or with the feature extractor network (e.g., FPN 202).

In some further examples, feature maps 204 may be sent to CNN 212. CNN 212 may be trained to generate a part embedding 220 for each part identified in the input 2D image data 110 (e.g., for each bounding box generated for the input 2D image data 110). The part embedding 220 may represent a 3D representation of the 2D image data that represents the part. CNN 212 may be trained using training data comprising 3D models of parts and 2D image data of the 3D models (e.g., projections of the 3D models of parts in 2D space).

3D embedding model 230 may be used during training to map the 3D models stored in the 3D model part library 140 into the same embedding space as the part embeddings 220 generated for the part represented in the input 2D image data 110. Some example machine learning models that may be used to implement 3D embedding model 230 may include Pointnet, Occupancy Nets, VoxelNet, Mesh R-CNNs, etc. Pointnet is a neural network that is effective to receive point cloud data as input in order to perform various 3D recognition tasks (e.g., object classification, part segmentation, scene semantic parsing). Herein, 3D embedding model 230 may be used to generate part embeddings 222 for each 3D model (e.g., each 3D model of parts) stored in 3D model part library 140. Accordingly, the part embedding generated by CNN 212 and the part embedding 222 generated for a particular 3D model stored in the 3D model part library 140 may be in the shared embedding space 240.

The distance between two parts in the shared embedding space 240 corresponds to the similarity between the two parts (with smaller distances being more similar). The training process ensures that the two shape embeddings of a given part (one shape embedding coming from the 2D image of a 3D model from the part library and the second shape embedding coming from the same 3D model in the 3D part library) are close together. Additionally, input images showing the object and/or part from different viewpoints may be used. The CNN 212 is trained so that embeddings generated from all the viewpoints are close to the embedding for the corresponding 3D model generated by the 3D embedding model 230. During inference, part embeddings are generated for all detected object parts by CNN 212. For each embedding, nearest neighbor algorithm 142 is used to search for embeddings of 3D object parts in 3D model part library 140 that are close in the shared embedding space 240.

Figure 3:
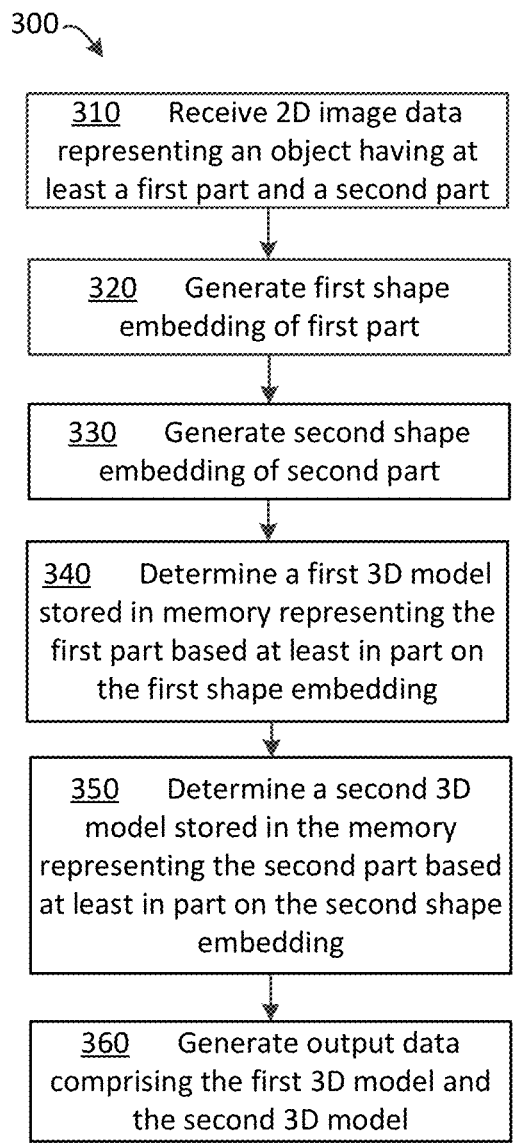
FIG. 3 is a flow chart depicting an example process for retrieving three-dimensional part models, in accordance with various aspects of the present disclosure.

FIG. 3 is a flow chart depicting an example process 300 for retrieving three-dimensional part models, in accordance with various aspects of the present disclosure. Those portions of FIG. 3 that have been previously discussed in reference to FIGS. 1-2 may not be described again for purposes of clarity and brevity. The actions of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 300 may begin at action 310, at which 2D image data may be received. For example, input 2D image data 110 may be received representing an object having at least a first part and a second part. The input 2D image data may represent any object for which a system 100 has been trained to retrieve 3D object part models, as described herein.

Process 300 may continue from action 310 to action 320, at which a first shape embedding of the first part may be generated. As described above in reference to FIG. 2, the system 100 may be trained to generate shape embeddings of each part identified in the input 2D image data. Additionally, the system 100 may be trained to determine a material (e.g., steel, fabrics, etc.) for each part identified in the input 2D image data.

Process 300 may continue from action 320 to action 330, at which a second shape embedding of the second part may be generated. As described above in reference to FIG. 2, the system 100 may be trained to generate shape embeddings of each part identified in the input 2D image data. Additionally, the system 100 may be trained to determine a material (e.g., steel, fabrics, etc.) for each part identified in the input 2D image data.

Process 300 may continue from action 330 to action 340, at which a first 3D model stored in memory (e.g., in 3D model part library 140) and representing the first part may be determined based at least in part on the first shape embedding. As described above in reference to FIG. 2, shape embeddings may be determined for each 3D model stored in the 3D model part library 140. During training of system 100, the shape embeddings may be learned such that a shape embedding determined for a particular part represented in the input 2D image data is close to the shape embedding for the stored 3D model of the same part (as represented by a 3D model in the 3D model part library 140). Accordingly, during inference, nearest neighbor algorithm 142 may determine the 3D model part from the 3D model part library 140 that is closest in the shared embedding space 240 to the part embedding determined for the part in the input 2D image data.

Process 300 may continue from action 340 to action 350, at which a second 3D model stored in memory (e.g., in 3D model part library 140) and representing the second part may be determined based at least in part on the second shape embedding. As described above in reference to FIG. 2, shape embeddings may be determined for each 3D model stored in the 3D model part library 140. During training of system 100, the shape embeddings may be learned such that a shape embedding determined for a particular part represented in the input 2D image data is close to the shape embedding for the stored 3D model of the same part (as represented by a 3D model in the 3D model part library 140). In other words, error between the part embedding 220 (generated by CNN 212) and the part embedding 222 (generated by 3D embedding model 230) for the same part may be minimized through back propagation and updating of parameters of the CNN 130 (including CNN 212 and/or FPN 202) and/or 3D embedding model 230. In at least some examples, 3D embedding model 230 may be trained together with the CNN 130, in an end-to-end fashion. Accordingly, during inference, nearest neighbor algorithm 142 may determine the 3D model part from the 3D model part library 140 that is closest in the shared embedding space 240 to the part embedding determined for the part in the input 2D image data.

Process 300 may continue from action 350 to action 360, at which output data comprising the first 3D model and the second 3D model may be generated. In various examples, the first 3D model and the second 3D model may be combined in a 3D model of the complete object. In at least some examples, the first 3D model and/or the second 3D model can be modified (in order to more realistically represent the part depicted in the input 2D image data).

Figure 4:
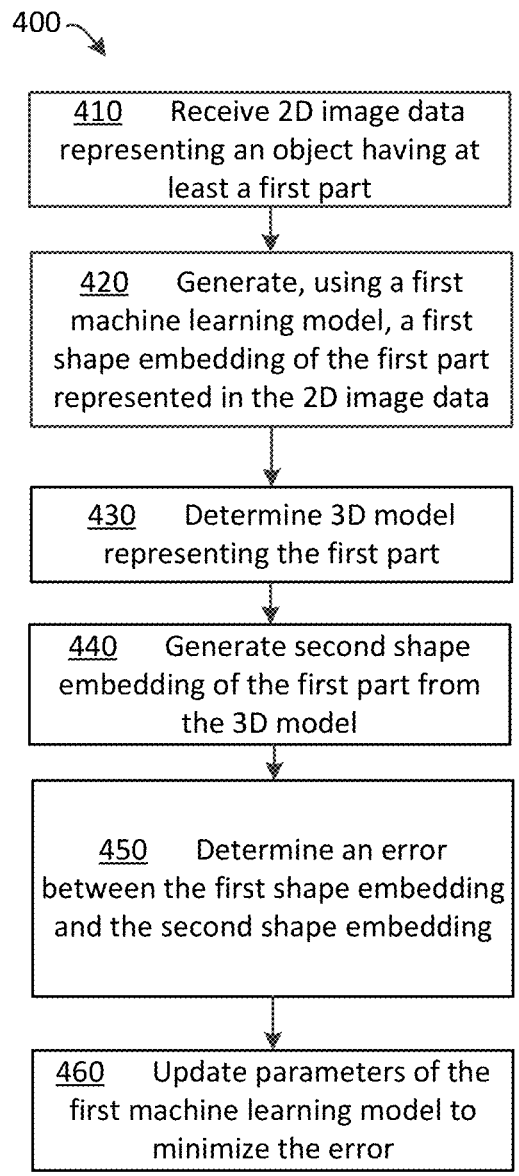
FIG. 4 is a flow chart depicting an example process for training a machine learning model to retrieve three-dimensional part models for input two-dimensional image data, in accordance with various aspects of the present disclosure.

FIG. 4 is a flow chart depicting an example process 400 for training a machine learning model to retrieve three-dimensional part models for input two-dimensional image data, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 410, at which 2D image data may be received. For example, input 2D image data 110 may be received representing an object having at least a first part. As described below, a 3D model for the first part may already exist and may be stored in memory. The 3D model for the first part may be artist generated and/or may be generated using a machine learning network trained to generate 3D image data (or using any other suitable method of 3D model generation). Accordingly, in at least some examples, the 2D image data received at action 410 may be a 2D projection of the 3D model. As previously described, the system 100 may be trained using various 2D images captured from different perspectives of a 3D model.

Process 400 may continue from action 410 to action 420, at which a first machine learning model (e.g., CNN 130 comprising CNN 212) may generate a first shape embedding of the first part represented in the 2D image data. At action 420, the CNN 212 head of the CNN 130 may generate a shape embedding representing the part in the input 2D image data.

Process 400 may continue from action 420 to action 430, at which a 3D model representing the first part may be determined. The 3D model representing the first part may be known during training. For example, a training instance may comprise a 3D model of a part (as ground truth data) and one or more 2D projections of the 3D model. Accordingly, the system 100 may be trained so that 3D embeddings generated by the CNN 212 head closely match the 3D embeddings for the ground truth 3D model.

Process 400 may continue from action 430 to action 440, at which a second shape embedding of the first part may be generated from the 3D model. As previously described, the second shape embedding may be generated from the 3D model using 3D embedding model 230 and/or a similar neural network. The second shape embedding generated at action 440 may be in the same embedding space as the first shape embedding generated at action 420.

Process 400 may continue from action 440 to action 450, at which an error may be determined between the first shape embedding and the second shape embedding. For example, the error may be a vector representing a Euclidean distance between the first and second shape embeddings in the shared embedding space 240.

Process 400 may continue from action 450 to action 460, at which parameters of the first machine learning model (e.g., CNN 130 comprising CNN 212) may be updated (e.g., by back propagating the error determined at action 450) in order to minimize the error.

Figure 5:
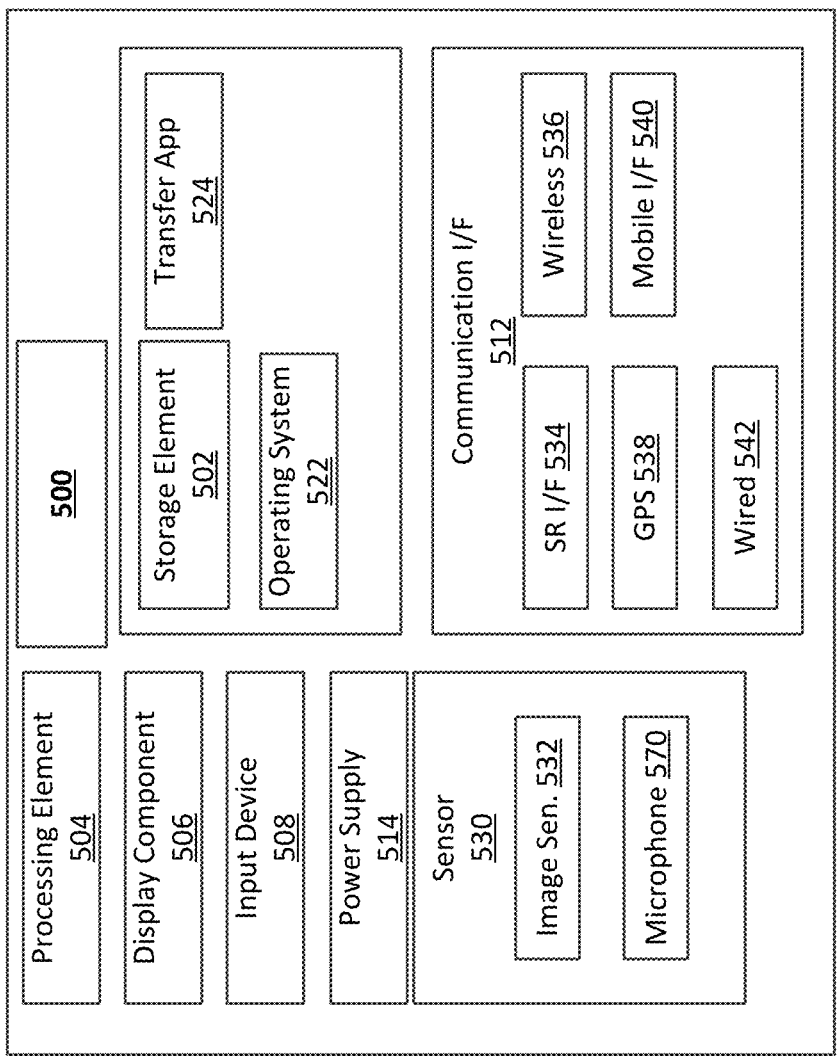
FIG. 5 is a block diagrams showing an example architecture of a computing device that may be used in accordance with various embodiments described herein.

FIG. 5 is a block diagram showing an example architecture 500 of a computing device that may be used to retrieve 3D object part models, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or 3D models generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
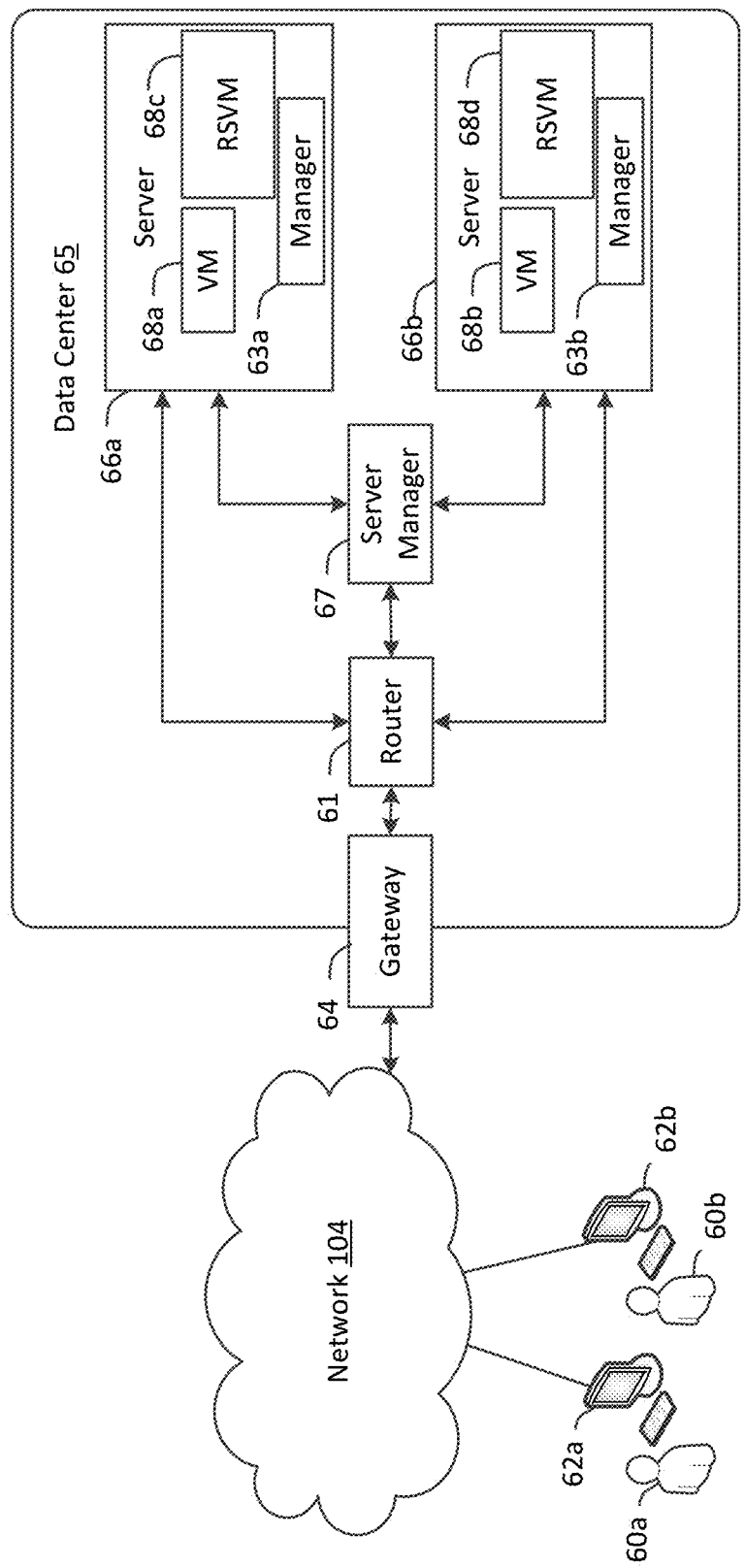
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide 3D object part model retrieval as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various 3D object part model retrieval techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
receiving two-dimensional (2D) image data representing an object with at least a first part and a second part;
identifying, by a first machine learning model, a first portion of the 2D image data of the object that corresponds to the first part and a second portion of the 2D image data of the object that corresponds to the second part;
generating, by the first machine learning model, a first shape embedding representing the first portion of the 2D image data;
generating, by the first machine learning model, a second shape embedding representing the second portion of the 2D image data;
determining a first 3D model stored in non-transitory computer-readable memory, wherein a third shape embedding is associated with the first 3D model;
determining a second 3D model stored in the non-transitory computer-readable memory, wherein a fourth shape embedding is associated with the second 3D model;
determining a first distance in a shape embedding space between the first shape embedding and the third shape embedding;
determining a second distance in the shape embedding space between the first shape embedding and the fourth shape embedding, wherein the first distance is less than the second distance;
selecting the first 3D model to represent the first part based at least in part on the first distance being less than the second distance;
retrieving the first 3D model from the non-transitory computer-readable memory representing the first part using the first shape embedding;
retrieving a third 3D model representing the second part from the non-transitory computer-readable memory using the second shape embedding; and
generating output data comprising the first 3D model and the second 3D model.

2. The method of claim 1, further comprising:
determining that the first distance is a minimum distance for the first shape embedding among a plurality of 3D models stored in the non-transitory computer-readable memory.

3. The method of claim 1, further comprising:
determining, by the first machine learning model, a first set of pixels in the 2D image data representing the first part and corresponding to the first portion, wherein the first shape embedding is further generated using the first set of pixels; and
determining, by the first machine learning model, a second set of pixels in the 2D image data representing the second part and corresponding to the second portion, wherein the second shape embedding is further generated using the second set of pixels.

4. The method of claim 1, further comprising:
determining, by the first machine learning model or a second machine learning model, a first material corresponding to the first part; and
determining, by the first machine learning model or the second machine learning model, a second material corresponding to the second part.

5. The method of claim 1, further comprising:
generating, by the first machine learning model, the first shape embedding representing the first part;
generating, by a second machine learning model, the second shape embedding representing the first 3D model;
determining an error between the first shape embedding and the second shape embedding; and
updating parameters of at least one of the first machine learning model and the second machine learning model to minimize the error.

6. The method of claim 1, further comprising:
generating, by a first branch of a convolutional neural network (CNN), the first shape embedding representing the first part;
generating, by the first branch of the CNN, the second shape embedding representing the second part;
generating, by a second branch of the CNN, a segmentation mask distinguishing at least some of a first set of pixels representing the first part in the 2D image data from other pixels in the 2D image data; and
generating, by a third branch of the CNN, a bounding box surrounding at least some of the first set of pixels representing the first part in the 2D image data.

7. The method of claim 1, wherein the 2D image data is first 2D image data and the object is a first object, the method further comprising:
receiving second 2D image data representing a second object with at least a third part, wherein the second 2D image data comprises a first bounding box surrounding the third part;
generating, by the first machine learning model, a prediction comprising a second bounding box;
determining a difference between the first bounding box and the second bounding box; and
updating parameters of the first machine learning model to minimize the difference.

8. The method of claim 1, further comprising:
generating the first shape embedding by inputting data representing the first portion into a convolutional neural network (CNN); and
generating the second shape embedding by inputting data representing the second portion into the CNN.

9. The method of claim 1, further comprising:
inputting the 2D image data into the first machine learning model trained to extract features distinguishing object parts from one another;
generating, by the first machine learning model, a first part embedding representing the first part and a second part embedding representing the second part;
generating, by a first convolutional neural network (CNN), the first shape embedding using the first part embedding; and
generating, by the first CNN, the second shape embedding using the second part embedding.

10. A system comprising:
at least one processor; and
at least one non-transitory computer-readable memory storing instructions that, when executed by the at least one processor, are effective to program the at least one processor to:
- receive two-dimensional (2D) image data representing an object with at least a first part and a second part;
- identify, by a first machine learning model, a first portion of the 2D image data of the object that corresponds to the first part and a second portion of the 2D image data of the object that corresponds to the second part;
- generate, by the first machine learning model, a first shape embedding representing the first portion of the 2D image data;
- generate, by the first machine learning model, a second shape embedding representing the second portion of the 2D image data;
- determine a first 3D model stored in the at least one non-transitory computer-readable memory, wherein a third shape embedding is associated with the first 3D model;
- determine a second 3D model stored in the at least one non-transitory computer-readable memory, wherein a fourth shape embedding is associated with the second 3D model;
- determine a first distance in a shape embedding space between the first shape embedding and the third shape embedding;
- determine a second distance in the shape embedding space between the first shape embedding and the fourth shape embedding, wherein the first distance is less than the second distance;
- select the first 3D model to represent the first part based at least in part on the first distance being less than the second distance;
- retrieve the first 3D model from the non-transitory computer-readable memory representing the first part using the first shape embedding;
- retrieve a third 3D model representing the second part from the non-transitory computer-readable memory using the second shape embedding; and
- generate output data comprising the first 3D model and the second 3D model.

11. The system of claim 10, wherein the at least one non-transitory computer-readable memory stores further instructions that, when executed by the at least one processor, are further effective to program the at least one processor to:
- determine that the first distance is a minimum distance for the first shape embedding among a plurality of 3D models stored in the at least one non-transitory computer-readable memory.

12. The system of claim 10, wherein the at least one non-transitory computer-readable memory stores further instructions that, when executed by the at least one processor, are further effective to program the at least one processor to:
- determine, by the first machine learning model, a first set of pixels in the 2D image data representing the first part and corresponding to the first portion, wherein the first shape embedding is further generated using the first set of pixels; and
- determine, by the first machine learning model, a second set of pixels in the 2D image data representing the second part and corresponding to the second portion, wherein the second shape embedding is further generated using the second set of pixels.

13. The system of claim 10, wherein the at least one non-transitory computer-readable memory stores further instructions that, when executed by the at least one processor, are further effective to program the at least one processor to:
- determine, by the first machine learning model or a second machine learning model, a first material corresponding to the first part; and
- determine, by the first machine learning model or the second machine learning model, a second material corresponding to the second part.

14. The system of claim 10, wherein the at least one non-transitory computer-readable memory stores further instructions that, when executed by the at least one processor, are further effective to program the at least one processor to:
- generate, by the first machine learning model, the first shape embedding representing the first part;
- generate, by a second machine learning model, the second shape embedding representing the first 3D model;
- determine an error between the first shape embedding and the second shape embedding; and
- update parameters of at least one of the first machine learning model and the second machine learning model to minimize the error.

15. The system of claim 10, wherein the at least one non-transitory computer-readable memory stores further instructions that, when executed by the at least one processor, are further effective to program the at least one processor to:
- generate, by a first branch of a convolutional neural network (CNN), the first shape embedding representing the first part;
- generate, by the first branch of the CNN, the second shape embedding representing the second part;
- generate, by a second branch of the CNN, a segmentation mask distinguishing at least some of a first set of pixels representing the first part in the 2D image data from other pixels in the 2D image data; and
- generate, by a third branch of the CNN, a bounding box surrounding at least some of the first set of pixels representing the first part in the 2D image data.

16. The system of claim 10, wherein the at least one non-transitory computer-readable memory stores further instructions that, when executed by the at least one processor, are further effective to program the at least one processor to:
- generate the first shape embedding by inputting data representing the first portion into a convolutional neural network (CNN); and
- generate the second shape embedding by inputting data representing the second portion into the CNN.

17. The system of claim 10, wherein the at least one non-transitory computer-readable memory stores further instructions that, when executed by the at least one processor, are further effective to program the at least one processor to:
- input the 2D image data into the first machine learning model trained to extract features distinguishing object parts from one another;
- generate, by the first machine learning model, a first part embedding representing the first part and a second part embedding representing the second part;

generate, by a first convolutional neural network (CNN), the first shape embedding using the first part embedding; and generate, by the first CNN, the second shape embedding using the second part embedding.

\* \* \* \* \*